United States Patent
Abeles et al.

(10) Patent No.: US 8,253,109 B2
(45) Date of Patent: Aug. 28, 2012

(54) SLAB SCINTILLATOR WITH INTEGRATED DOUBLE-SIDED PHOTORECEIVER

(75) Inventors: Joseph H. Abeles, East Brunswick, NJ (US); Serge Luryi, Old Field, NY (US)

(73) Assignees: SRI International, Menlo Park, CA (US); Research Foundation of State University of New York, Albany, NY (US)

( * ) Notice: Subject to any disclaimer, the term of this patent is extended or adjusted under 35 U.S.C. 154(b) by 0 days.

(21) Appl. No.: 13/296,516

(22) Filed: Nov. 15, 2011

(65) Prior Publication Data

US 2012/0056096 A1 Mar. 8, 2012

Related U.S. Application Data

(63) Continuation of application No. PCT/US2010/001496, filed on May 18, 2010.

(60) Provisional application No. 61/216,572, filed on May 18, 2009.

(51) Int. Cl.
*G01T 1/20* (2006.01)

(52) U.S. Cl. ....... 250/366

(58) Field of Classification Search ........ 250/366, 250/361 R

See application file for complete search history.

(56) References Cited

U.S. PATENT DOCUMENTS

| | | | |
|---|---|---|---|
| 3,950,648 A * | 4/1976 | Martone et al. | 250/369 |
| 7,265,354 B2 | 9/2007 | Kastalsky et al. | |
| 2008/0191138 A1* | 8/2008 | Kastalsky et al. | 250/361 R |
| 2011/0019895 A1* | 1/2011 | Mizuta et al. | 382/131 |

OTHER PUBLICATIONS

Kastalsky, et al., "Semiconductor high-energy radiation scintillation detector", Nuclear Instruments and Methods in Physics Research A 565, (2006), pp. 650-656, Elsevier B.V.

Burstein, Anomalous Optical Absorption Limit in InSb:, Phys. Rev. 93, (1953-1954), pp. 632-633.

Gallant, et al. "Metalorganic chemical vapor disposition InGaAs p-i-n. photodiodes with extremely low dark current" Appl. Phys. Lett. 52 No. 9, (1988), pp. 733-735.

Liu, et al. "Simple, very low dark current, planar long-wavelength avalanche photodiode", Appl. Phys. Lett. 53, No. 14, (1988), pp. 1311-1313.

Van Roosbroeck, et al., "Photon-Radiative Recombination of Electrons and Holes in Germanium", Physical Review, (1954), pp. 1558-1560, vol. 94, No. 6.

Ullrich, et al., "Photoluminescence analysis of p-doped GaAs using the Roosbroeck-Shockley relation", Semicond. Sci. Technol. 22, (2007), pp. 1174-1177, IOP Publishing Ltd.

(Continued)

*Primary Examiner* — Kiho Kim
(74) *Attorney, Agent, or Firm* — Lawrence G. Fridman

(57) ABSTRACT

An article comprising a slab generating scintillation light in response to ionization event and formed with at least two sides. The ionization event is resulted from interaction of high-energy particles within a material of the slab between these sides. A photoreceiver sensitive to the scintillation light is integrated on each side of the slab in an optically-tight fashion. An arrangement is provided for analyzing signals resulted from the ionization event and generated by the photoreceivers. The photoreceivers and the analyzing arrangement are adapted for extracting a position of the ionization event within the slab material relative to the slab sides. A correcting arrangement is provided for correcting the signals and to provide attenuation of the scintillation light.

17 Claims, 7 Drawing Sheets

OTHER PUBLICATIONS

Sagalowicz, et al., "Defects, structure, and chemistry of InP-GaAs interfaces obtained by wafer bonding", Journal of Applied Physics, (2000), pp. 4135-4146, vol. 87, No. 9.

Mereuta, et al., "In (A1)GaAs-AlGaAs Wafer Fused VCSELs Emitting at 2- m Wavelength", IEEE Photonics Technology Letters, (2008), pp. 24-26, vol. 20, No. 1.

Liang, et al., "Low-Temperature, Strong Si0—Si0 Covalent Wafer Bonding for III-V Compound Semiconductors-to-Silicon Photonic Integrated Circuits", Journal of Electronic Materials, (2008), pp. 1552-1559, vol. 37, No. 10.

Subashiev, et al., "Transmission properties of optical adhesives and bonding layers", arXiv:0903.007v1 [physics.optics], (2009), pp. 1-9.

International Search Report PCT/US10/01496, pp. 1-7 (International filed May 18, 2010).

International Preliminary Report on Patentability PCT/US10/01496, pp. 1-5 (International filing date May 18, 2010).

* cited by examiner

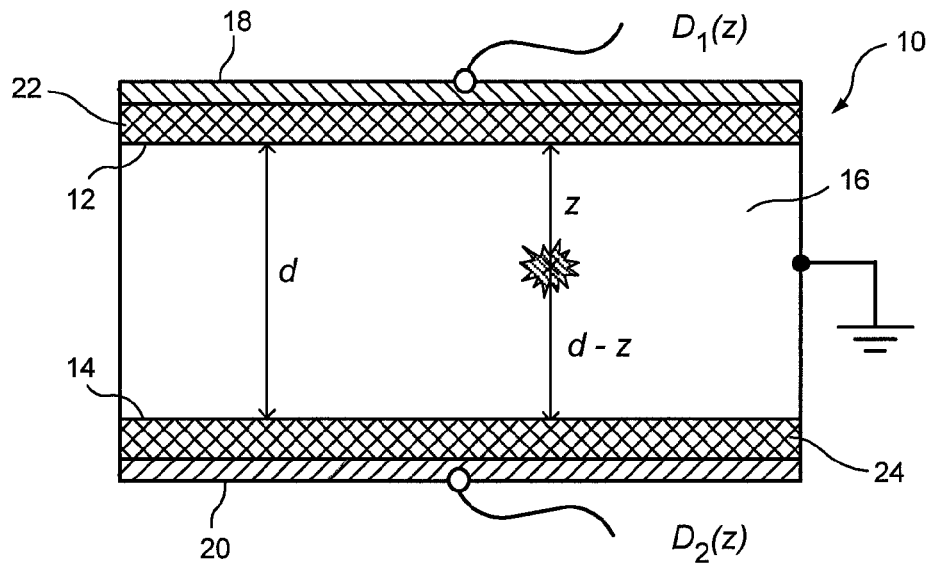
F I G. 6
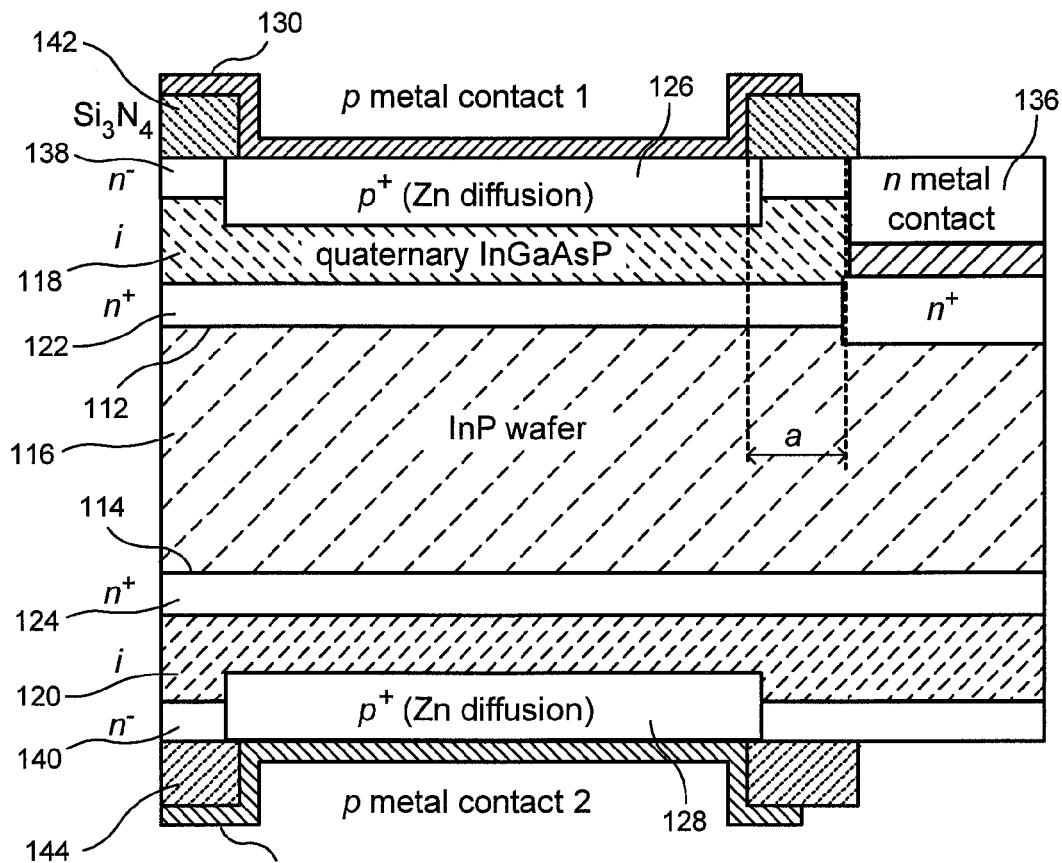
F I G. 7

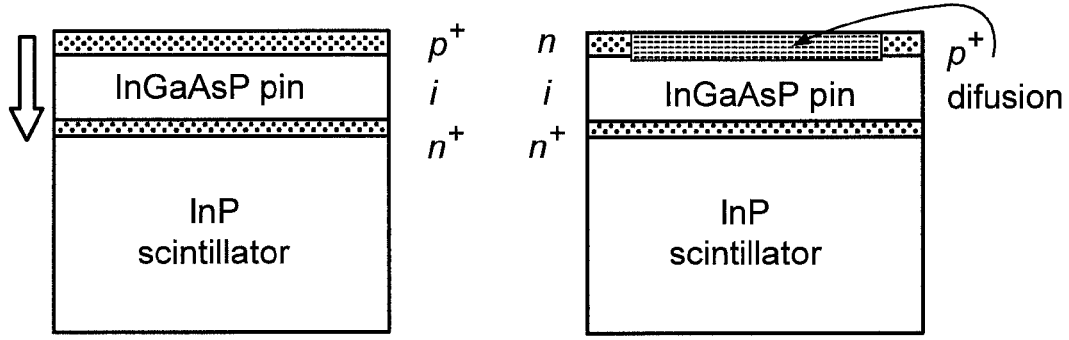
F I G. 8            F I G. 9
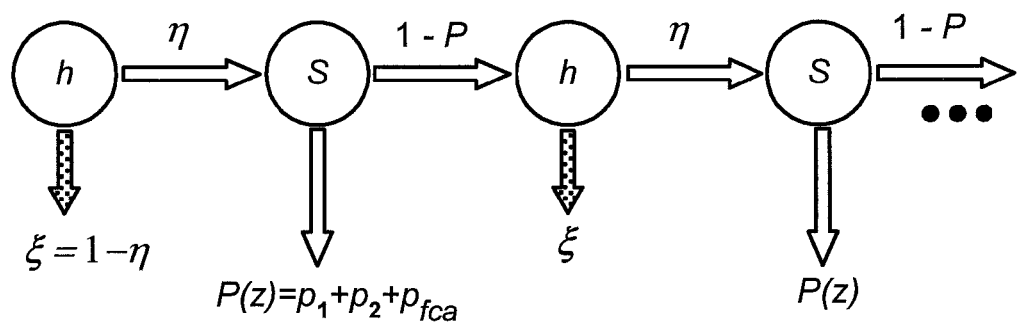
F I G. 10

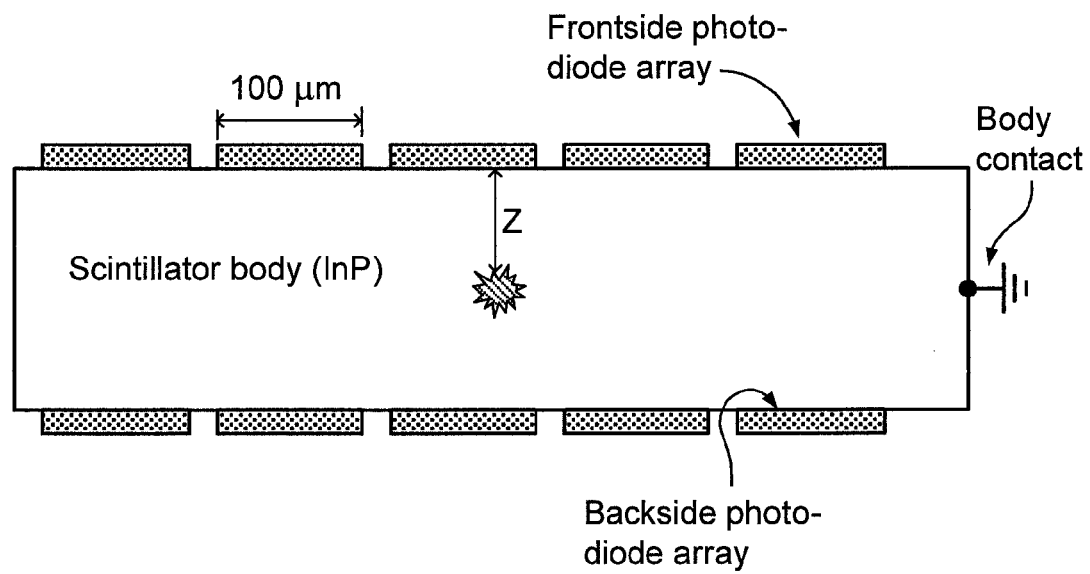
F I G. 13

SLAB SCINTILLATOR WITH INTEGRATED DOUBLE-SIDED PHOTORECEIVER

REFERENCE TO RELATED APPLICATIONS AND PRIORITY CLAIM

This application is a continuation of currently pending International Application PCT/US2010/001496 filed May 18, 2010, which claims priority of U.S. Provisional Application Ser. No. 61/216,572 filed by the inventors on May 18, 2009.

STATEMENT OF GOVERNMENT INTEREST

This invention was made with United States government support under grant number 2007-DN-077-ER0005 awarded by the Department of Homeland Security. The government has certain rights in the invention.

FIELD OF THE INVENTION

The invention relates in general to scintillators. In particular, the invention relates to implementation of high-energy radiation detectors based on semiconductor scintillator wafers.

BACKGROUND OF THE INVENTION

There are known two large groups of solid-state radiation detectors, which dominate the area of ionizing radiation measurements, scintillation detectors and semiconductor diodes. The scintillators detect high-energy radiation through generation of light which is subsequently registered by a photodetector that converts light into an electrical signal. Semiconductor diodes employ reverse biased p-n junctions where the absorbed radiation creates electrons and holes, which are separated by the junction field thereby producing a direct electrical response.

Many scintillators are implemented in wide-gap insulating materials doped ("activated") with radiation centers. One of the major benefits of using semiconductor materials is the mature state of technology that enables the implementation of epitaxial photodiodes integrated on the surface of a semiconductor slab.

FIG. 1 shows a cross-section of the prior-art semiconductor (InP) scintillator with an epitaxially integrated photodiode created on one of its sides or surfaces.

The prior-art pixel architecture in the form of the cleaved pixel design is illustrated in FIG. 2. The key motivation for this design is as follows. One is concerned with ensuring spatial independence of the scintillation flux on the pixel photodiodes, so that the readout would be the same irrespective of where the interaction occurred in the volume of pixel. Due to the high refractive index of InP, only a small fraction of radiation impinging on the side surface from a random point will escape, while most of the radiation will be internally reflected and eventually reach the absorbing photodiode. If the scintillator material is highly transparent to its own luminescence, the cleaved pixel design should deliver most of the radiation generated within the pixel to the photodiode on its surface. The ideal highly transparent semiconductor scintillator remains elusive and one of the objects of the present invention is to accommodate some degree of optical extinction in the scintillator material. Another problem of the integrated pixel design is the large capacitance of the pixel photodiode. FIG. 2 illustrates an example for the pin diode having thickness of about 2 µm and area of 1 mm×1 mm, where the capacitance is about 50 pF. The large diode capacitance makes it difficult to detect small amounts of photo-generated charge.

We are referring now to FIG. 3, which illustrates an alternative prior-art design that addresses the issue of high capacitance. The idea is to make an array of photodiodes of much smaller area than that of the detector itself, without cleaving. The full power of planar integrated technology is then deployed. For example, if 100 µm×100 µm diodes are used, instead of 1 mm×1 mm, the capacitance goes down by two orders of magnitude. However, the number of photons collected by a single mini-pixel decreases, albeit by a smaller amount. The reason for the decreasing number of photons is because photons generated by a single ionization event (a Compton or photoelectric interaction in the given slab) are now shared by several 2D photodiodes. The total area of illuminated photodiodes is of the order $z^2$, where z is the distance from the interaction region to the top surface of the detector, i.e. the surface where the epitaxial photodiodes are located in the prior art design. Inasmuch as $z^2 \ll 1$ mm$^2$, the amount of photons received by a nearest single 100 µm×100 µm photodiode decreases by the smaller amount, compared to the 100-fold decrease in the area. The integrated pixel design thus enhances the charge per capacitance ratio. This implies a higher voltage developed in a single diode in response to receiving the scintillating radiation and therefore a higher signal to noise ratio.

One of the advantages of the integrated pixel design associated with the present invention is the capability of assessing the position of the ionizing interaction (i.e., the distance z from the interaction region to the top area of the detector) from the measured lateral response distribution of the 2D photodiode array. Such assessment cannot be expected to be very accurate, but one can indeed expect that an ionizing event at the distance z deep into the scintillator slab will illuminate a circular spot on the surface of radius r≈z with the illumination intensity decreasing radially away from the nearest photodiode.

The problem associated with the prior art designs of FIG. 2 and FIG. 3 relates to insufficient transparency of InP at room temperature to its own scintillation. This problem is illustrated in FIGS. 4 and 5, which show the luminescence spectra originating from the photoexcitation near one of the InP slab surfaces and observed either from the side of incident excitation or from the opposite side of semiconductor slab. The former spectrum is referred to as the reflection luminescence and the latter the transmission luminescence. FIG. 4 is a schematic diagram illustrating the geometry of the photoluminescence experimental arrangement with InP wafer which is shown as a slant member with the light being directed to the wafer. Some of the light is reflected back, as a reflection luminescence. The spectrum of the reflection luminescence is measured by a measuring device which can be in the form of monochromator. Some of the luminescence goes through the entire wafer and is collected by another measuring device or monochromator on the other side thereof, in the form of transmission luminescence. For a transparent material a transmission luminescence will be as strong as a reflection luminescence.

FIG. 5 shows the spectra obtained at room temperature (300K). Luminescence spectra of 350 µm thick InP wafer doped with shallow donors (S) to the level $N_D$=6.3×10$^{18}$ cm$^{-3}$, addition to the reflection and the transmission luminescence spectra, FIG. 5 shows the spectrum of transmission of incident light across the wafer.

As can be seen in FIG. 5, substantially the long-wavelength portion of the reflection luminescence spectrum is observed in the transmission geometry and the optical power of the transmission luminescence signal is at most 20% of the reflection luminescence signal. This constitutes a major problem for some of the intended applications of the scintillator, associated with the accurate determination of the deposited energy. The problem is how to distinguish the signal arising from a substantial energy deposited far from the photoreceiver surface from that arising from smaller energy deposited near this surface.

The problem is clearly owing to the attenuation of the optical signal. Still, if the distance z from the photoreceiver surface of the high-energy radiation absorption (ionization) event will be known, correction for the attenuation will be possible. For the prior-art scintillators, the distance z (see FIG. 3) is not accurately knowable. To some extent, one could deduce the distance z from the intensity distribution in the illuminated spot in the integrated photo-diode array architecture, as previously discussed in connection with the prior art design shown in FIG. 3. However, this approach has not been considered in the prior art, in part because it cannot be expected to provide an accurate estimate of the position and in part because it would place extremely high demands on the sensitivity of individual pixels.

SUMMARY OF THE INVENTION

One aspect of the invention provides a compound semiconductor single-crystal scintillator in wafer form with an epitaxially grown detector array on the obverse face. Alternatively there is a wafer-bonded silicon-based detector array, having a buried sense node (such as a CCD detector) with a tight interface between the high-refractive-index materials of the scintillator and detector array wafers.

Another aspect of the invention relates to a wafer scintillator having not single, but multiple (two, for example) separate detector arrays, wherein one detector array is provided on the obverse side and an additional array on the reverse side of the compound semiconductor scintillator wafer.

As to a further aspect of the invention, the purpose of providing an integrated scintillator/detector-array is to provide the accurate measurement of the energy deposited in Compton scattering events such as may occur when a gamma particle scatters from an electron situated within the scintillator material. Accurate measurements are essential to determine the energy of the incoming gamma particle and its direction of arrival. It is known that attenuation of the scintillation light within the semiconductor scintillator tends to interfere with the accuracy of determination of the energy deposited by a Compton scattering event. Accordingly, an essential aspect of the present invention is to provide an arrangement with multiple, in general, and in particular with a pair of, independent detector arrays juxtaposed on opposite faces of the semiconductor crystal. This arrangement obviates the prior art inaccuracy of Compton energy determination incurred in the case of a detector array situated on only one face of the compound semiconductor scintillation crystal.

This prior art inaccuracy arises because of the variability of the detected signal as a function of the distance from the crystal surface, such that scintillation events occurring at a depth more distant from the surface at which photodetectors are situated give rise to smaller amplitudes of detected signal. The fall-off in signal strength of the detected scintillation signal with increasing distance from the photodetector is, in principle, known accurately both from theory and experimental trials.

In the prior art, a photodetected scintillation signal of greater or lesser strength can only be interpreted ambiguously, since a signal of, e.g., greater strength could arise either from a greater amount of energy deposited in the scintillation event or, alternatively, from a scintillation event situated in closer proximity to the detector that measures its intensity by counting the resulting scintillation photons. Scintillation events deposit energy in a volume of some 10s of microns in diameter within a semiconductor crystal of at least 300 microns thickness, and potentially thicker. Hence, the prior art provides a method for unambiguous determination of neither the depth of the scintillation event, nor the energy deposited in that scintillation event.

The present invention substantially eliminates inaccuracy in determination of energy deposited in any given scintillation event, such as a Compton scattering event, because the distance from the crystal surface can now be inferred by the relative strength of the detected signal that, as taught by the present invention is detected not at one, but at both, surfaces essentially simultaneously. That is, by comparison of the relative signal strengths at each of the two surfaces, summing in the process the signal strengths detected at all detectors situated at each surface to arrive at the total for each surface, it may be determined at which depth the scintillation event occurred. Further, by summing the signal strengths as modified by the known attenuation of scintillation light signals for that particular depth, the total amount of energy deposited by the scintillation event may also be determined.

According to the present invention, the scintillation event may be caused by gamma-ray scattering such as Compton scattering, or by other ionizing radiation events. Thus the taught detector is not restricted to detection of Compton scattering by gamma rays, but could detect other ionizing radiation events including scattering of alpha particles, beta particles, or other ionizing radiation such as neutrons or neutral particles, or ions that through their interaction with the scintillator material can result in the generation of scintillation light in localized scattering events.

The specific nature of the attenuation phenomenon depends in detail on the physics of photon recycling, isotropic emission of photons within the scintillator, and related phenomena, and has been analyzed quantitatively in detail reflected in the charts of FIGS. 11 and 12. The calculations should be performed having as known quantities the energy measured in each of the two juxtaposed detectors for any one particular volume element of the combined presently taught scintillator-detector-array.

As to still another aspect of the invention, the distance from one or another face of the compound semiconductor scintillator can be simultaneously derived quantitatively similarly in analogy with the method of determining the energy. Thus, the scintillator-detector-array of the invention is used to determine the depth of any given scintillation event with accuracy much finer than the thickness of the scintillator itself.

As to still a further aspect of the invention, the compound semiconductor scintillator may be replaced by other scintillation materials provided that suitable optical transmission can be effected across the boundary between scintillation material and detector arrays situated on opposing surfaces of said scintillation material.

Although the best mode for detection of scintillation photons entails highly transmissive optical interfaces between the scintillation material and its two surfaces with detectors, the present invention also applies when the optical transmission between the scintillator material and the detectors is impaired, as would be the case, e.g., when the two are composed of materials having dissimilar refractive indexes. In such a case, the strength of the detected signal would be weaker and, consequently, owing to lesser signal-to-noise ratio in that case, the accuracy of determination of scintillation position and energy would be compromised to the extent that the optical signals were compromised.

It is understood that the present invention teaches, as well, that the lateral position of the scintillation event would be determined by comparing the strength of the signals in adjacent pixels situated on the same surface of the scintillator. According to this consideration, the position of the scintillation event can then be localized in all three dimensions within the scintillation material.

A further aspect of the invention relates to the integration of the system with power, control, display, tilt and rotation sensors, positional sensors (such as global positioning system receivers and location finders), and communication/networking subsystems as may advantageously be deployed in a system implementation.

A preferred embodiment of the invention provides a scintillator slab, exemplarily a direct-gap semiconductor like InP, having two photoreceiver systems situated on opposite sides of the slab and further provided with means for analyzing the two signals arising from the same ionization event for the purpose of determining the approximate position z in the slab and correcting the photoreceiver responses for the possible attenuation associated with insufficient slab transparency. Semiconductor scintillators are considered to be one of the essential aspects of the present invention primarily because the problem described above is particularly acute with semiconductors. However, use of other material systems is also within the scope of the invention, specifically those, where an attenuation correction of the received signal is desirable in view of the inadequate transparency of the scintillator material and also where determination of the approximate position z of the ionization event is desirable for the purpose of imaging the source of radiation.

A further essential aspect of the present invention is the ability to extract the event position, characterized by a distance z from one of the slab faces or surfaces, by analyzing the two photoreceiver signals generated from the same ionization event. It has been ascertained by calculations that it is sufficient to know the ratio of the two signals to make an accurate estimate of the event position. Another essential aspect of the invention is the ability to correct for the attenuation after the position of the event has been ascertained. Both of these capabilities are obtained by theoretical calculations combined with experimental validation. According to this invention, these calculations and experiments should be performed prior to practical deployment of the scintillator.

BRIEF DESCRIPTION OF THE DRAWINGS

Referring now to the Drawings which are provided to illustrate and not to limit the invention, wherein

FIG. 6 is a schematic diagram showing an InP scintillator of the invention with two photoreceiver units integrated on both faces thereof in an optically tight fashion;

FIG. 7 is a schematic cross-sectional diagram showing the scintillator of the invention with two surface photoreceivers or photodiodes fabricated by epitaxial growth and subsequent processing on both faces thereof;

FIG. 8 is a schematic diagram of an epitaxial pin diode design having unacceptable leakage due to a parasitic current path on the cleaved crystal sidewall;

FIG. 9 is a schematic diagram showing a design of the invention where the cleaved crystal sidewall is no longer under bias;

FIG. 10 is a schematic diagram of a photon-recycling process taking place in the InP scintillator with two photon-absorbing photodiode surfaces (similar to that of FIG. 6);

FIG. 13 is a schematic diagram showing the scintillator slab of the invention with two integrated arrays of small area diodes on opposite faces of the slab.

DETAILED DESCRIPTION OF THE INVENTION

Figure 1:
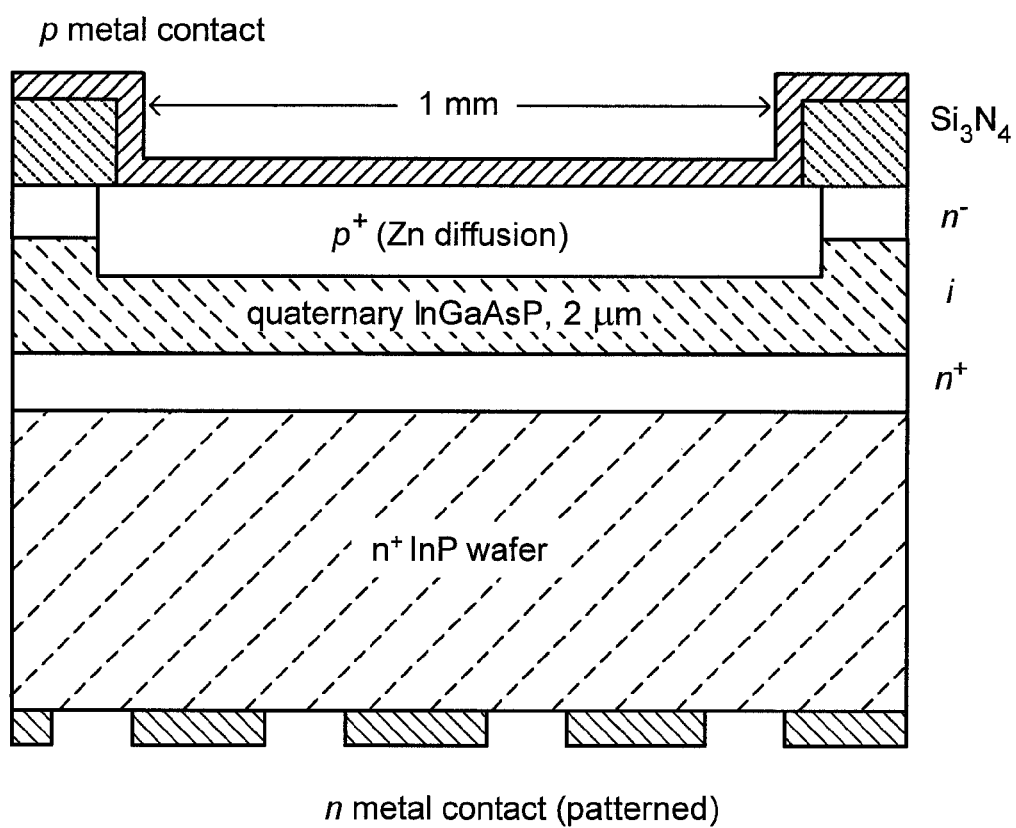
FIG. 1 is a schematic-cross-sectional view of the prior art scintillator with a surface photodiode integrated by epitaxial growth.
Figure 2:
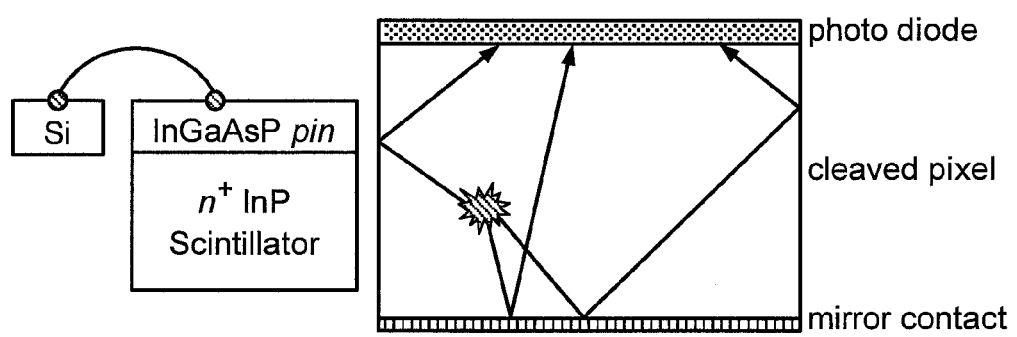
FIG. 2 is a schematic diagram of a cleaved-pixel design.

An essential aspect of the invention relates to the composition of the scintillator body and addresses an essential issue of forming a semiconductor which is transparent at wavelengths of its own fundamental interband emission. The emission wavelengths constitute the scintillation spectrum of the radiation detector, where InP scintillation spectrum is within a relatively narrow band near 920 μm. The transparency of semiconductor body to its own radiation facilitates delivery of the scintillating photons generated by high energy radiation event deep inside the semiconductor wafer to the faces or surfaces of the wafer.

Another aspect of the invention concerns how to ensure the collection of the scintillating photons in a photodetector. External detectors are often inefficient for this purpose for the following reason. In view of the high refractive index of semiconductors, e.g., n=3.3 for InP, most of the scintillating photons will not escape from the semiconductor but suffer a complete internal reflection. Only those photons that are incident on the InP-air interface within a narrow cone $\sin \theta < 1/n$ off the perpendicular to the interface, have a chance to escape from the semiconductor. The escape cone accommodates only about 2% of isotropic scintillation, resulting in an inefficiency of collection.

A still further aspect of the invention relates to three dimensional (3D) pixellation of the scintillator response. A stack of individually contacted 2D pixellated semiconductor slabs forms a 3D array of radiation detectors. A gamma photon incident on such an array, undergoes several Compton interactions depositing varying amounts of energy $L_i$ in pixels with coordinates $(x_i, y_i, z_i)$, where $z_i$ describes the position in the stack of the slab with a responding ("firing") pixel and $(x_i, y_i)$ are 2D coordinates of the firing pixel in that slab. Thus, each incident photon produces a cluster of firing pixels that provide their positions and the amount of energy deposited. Such information enables a skilled practitioner to estimate both the incident photon energy and the direction to the source.

We are referring now to FIG. 6, showing the schematic diagram of the InP scintillator 10 of the invention formed with first 12 and second 14 faces or surfaces oppositely disposed with respect to each other and a body of the scintillator slab or wafer 16. The slab 16 generates scintillation light in response to the ionization event (shown by the explosion symbol). The ionization event is resulted from interaction of high energy particles within a material of the slab between first and second surfaces. The respective photoreceivers or photoreceiving units 18 and 20 sensitive to the scintillator light are integrated on each face of the scintillator slab in an optically tight fashion. Thus, there are two substantially symmetric sets of photoreceiving units provided on the first 12 and second 14 faces of the scintillator slab. In one of the embodiments, the photoreceiving units are in the form of photodiodes. More specifically, in this embodiment the slab or scintillator wafer 16 is provided with the optically-tight photodiodes 18 and 20 which are implemented as quaternary epitaxially grown InGaAsP pin photodiodes having substantially similar refractive indexes and are sensitive to InP scintillation. Thin contact layers 22 and 24 are provided between the slab or wafer 16 and the respective photoreceivers.

The location of the schematically illustrated interaction event occurring inside the scintillator is identified by the respective coordinates. In the diagram of FIG. 6 the entire extent of the scintillator slab body 16 is identified by the symbol d. The orientation of the event relative to the first face 12 is identified by the coordinate z. In a similar manner, orientation of the event relative to the second face 14 is identified by the coordinate d-z. In response to the ionization event the first 18 and second 20 photoreceivers produce respective signals $D_1$ and $D_2$. An analyzing arrangement is provided for analyzing signals resulted from the ionization event and generated by the photoreceivers. The photoreceivers and the analyzing arrangement are adapted for extracting a position of the ionization event within the slab material relative to the first and second surfaces. It will be discussed in the application that operation of the analyzing arrangement can be based on pre-calculated functional dependence of a ratio of the obtained signals on a position of the ionization event relative to the sides of the slab. Use of any state-of-the-art analyzing arrangements capable of performing the required functions is within the scope of the invention. A correcting arrangement is provided for correcting the signals, so as to provide attenuation of the scintillation light generated during ionization event between the first and second slab surfaces and passing through the slab material. It will be discussed in the application that operation of the signal correcting arrangement can be based on pre-calculated functional dependence of the signal attenuation on a position of the ionization event relative to the sides of the slab. Utilization of any state-of-the-art correcting arrangements capable of performing the above-mentioned functions is contemplated by the invention.

Figure 3:
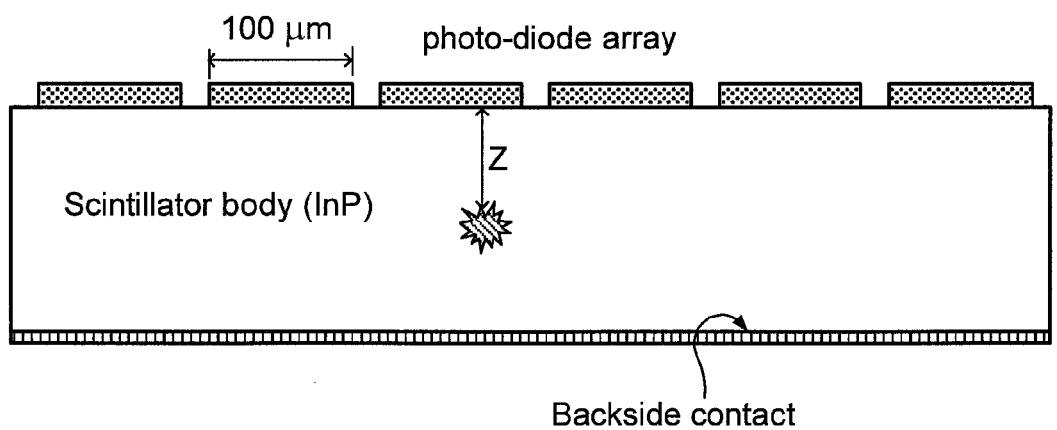
FIG. 3 is a schematic diagram of an integrated pixel architecture.
Figure 4:
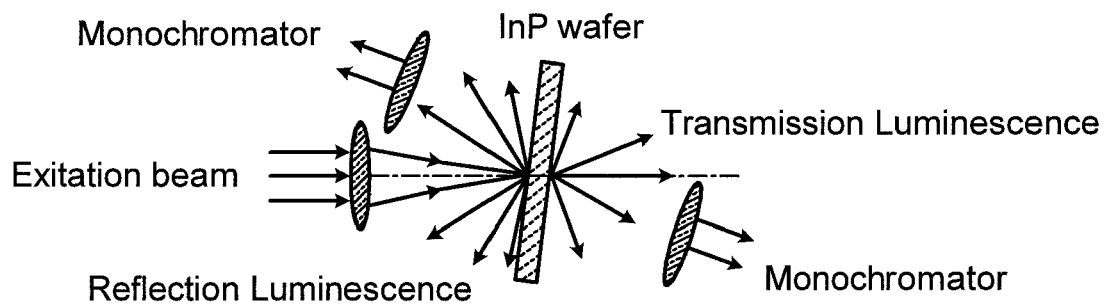
FIG. 4 is a schematic diagram illustrating the geometry of photoluminescence experiments.

In the prior art arrangements where only one photoreceiver is provided (see FIGS. 1 and 3), only one signal, such as for example $D_1$, is generated. The value of $D_1$ signal depends on how deep within the body of the semiconductor slab the interaction occurs (see coordinate z). In this task an interaction occurring close to the photoreceiver or detector provides a strong signal, whereas the same interaction occurring far away from the photoreceiver provides a weaker signal. Thus, in the prior art it is difficult to separate strong interactions taking place far away from the photoreceiver or detector, from the weak interactions occurring near the photoreceiver and the respective face of the slab. Such interactions often produce similar signals making it difficult to provide objective determination of their strength. In view of the above, the ability of providing an objective determination of the strength of interactions taking place within the body of the semiconductor slab of the scintillator is one of the most important aspects of the invention. Since there are multiple, two for example, photoreceivers 18 and 20 provided in the invention, multiple signals are generated by the detectors. In the preferred embodiment, the first and second photoreceivers produce signals $D_1$ and $D_2$. The ratio of these signals provides sufficient indication of z coordinate, facilitating accurate determination of where the interaction occurred. Measurement of $D_1$ and $D_2$ signals not only provides the overall value of these signals, but significantly makes it possible to determine the ratio of $D_1$ and $D_2$ signals which is a clear indication of the actual meaning of z coordinate.

Since the scintillator slab 16 illustrated in FIG. 6 is formed with two photoreceivers and two read-out circuits associated with the opposite faces 12, 14 of the slab, this arrangement provides the ability to extract the ionization event position, characterized by a distance z from one of the slab face. This occurs by analyzing both photoreceiver signals $D_1$ and $D_2$ generated from the same ionization event. According to the invention it is sufficient to ascertain the ratio of these two signals to make an accurate estimate of the event position. Another essential feature of the invention is the ability to correct for the attenuation after the event position has been ascertained. Both of these capabilities can be obtained by calculations coupled with experimental validation.

The calculated ratio $p(z)=D_2/D_1$ of two signals is plotted in FIG. 6 for different doping levels. It is assumed that the photodiodes themselves are ideal and identical on both sides. According to the embodiment of FIG. 6 simultaneous measurement of the signal responses $D_1$ and $D_2$ provides information sufficient to locate the position z of the interaction event.

In one of the embodiments of the invention the photoreceivers are epitaxial InGaAsP pin photodiodes grown on an InP scintillator wafer of thickness d=350 μm, while thickness of epi diodes is ≈2 μm (exaggerated in the figure). The signal amplitudes produced by the photoreceivers or photodiodes 18 and 20 in response to the same ionizing interaction, are denoted by $D_1(z)$ and $D_2(z)$, respectively. In this embodiment the lateral dimensions of the scintillator can be about 1 mm.

It is contemplated that the photoreceivers such as quaternary InGaAsP pin diodes are epitaxially grown on InP scintillator slab. However, other techniques for optically tight integration of photoreceiver units are within the scope of the invention. This is especially so for scintillator materials other than InP, where lattice-matched layers sensitive to the scintillator luminescence may not be available for high-quality epitaxial growth. The epitaxially grown quaternary layers of the photodiodes are substantially symmetrically disposed on both side surfaces of the slab.

FIG. 7 is a cross-sectional view of the scintillator of the invention with photoreceivers or photodiodes sensitive to the scintillation light formed on the respective opposite sides 112 and 114 of the wafer 116. Independent photoreceivers are formed by the epitaxial growth of $n^+ i\ n^-$ layers on both sides of the InP scintillator wafer 116. As to the top part of the structure, the epitaxial layer comprises a thin first epitaxial semiconductor (exemplarily, 0.2 μm) $n^+$ layers 122 overlaid by the respective undoped ("intrinsic") i base or a second epitaxial layer 118 having thickness of about 2 μm and by a thin (exemplarily, 0.2 μm), low-doped (exemplarily, $10^{17}$ cm$^{-3}$) top or third semiconductor $n^-$ layer 138. The $p^+$ doping region 126 is introduced by a selective diffusion of Zn, which can be accomplished by prior covering the surface of top or third semiconductor layer with a dielectric layer 142. In one of the embodiments the dielectric layer 142 can be, for example, $Si_3N_4$ having thickness of about 0.2 μm. In the preferred embodiment of the invention, the epitaxial layer structure is substantially symmetric relative to both sides 112, 114 of the wafer 116. Thus, at the bottom part of the structure a thin epitaxial semiconductor $n^+$ layer 124 is overlaid by the intrinsic i base epitaxial layer 120 and by a semiconductor $n^-$ layer 140. Similar to the above, the p$^+$ doping region 128 is introduced by a selective diffusion Zn. A dielectric layer 144 can be also provided having functions similar to that of the layer 142 discussed above.

It is essential that the epitaxial layer structure is symmetric on both sides of the wafer. The p$^+$ contact structures are also preferably symmetric. The reason for the preferred symmetry is to ensure the similar sensitivity and efficiency of photodiodes on both sides of the structure. It is essential that the regions of Zn diffusion on both sides of the wafer are aligned relative to one another.

Whether or not the n$^+$ contact structure is symmetric is optional. From the standpoint of handling contacts to the processed chip it may be advantageous to arrange the n$^+$ contact structure on one side only, as shown in FIG. 7, and rely on the high conductivity of the scintillator wafer.

Some of the layers discussed above are metal contacts provided on both sides of the structure. As to the top area of the structure, p metal contact 130 is provided to p$^+$ zinc diffusion region 126. Similarly n metal contact 136 is associated with the n$^+$ region or layer 122. Although a combination of p and n metal contacts is illustrated in FIG. 7 with respect to the top area, provision of a similar contact combination at the bottom area of the structure is also contemplated.

The distance a (see FIG. 7) between the edges of the openings in $Si_3N_4$ that define the lateral separation between the p$^+$ and the n$^+$ regions should be sufficiently large to prevent sidewall leakage under reverse bias of the photodiode. In this embodiment, the separation of d>5 μm should be sufficient. The structure of both p$^+$ and n$^+$ contacts to the doped layers of the photodiode should be accessed from the same side, at least for one of the photoreceivers or diodes.

An essential aspect of the present invention is the capability to analyze the signal produced by the two surface photodiodes in response to a single ionization event so as to determine the position of the event and therefore correct for attenuation of the optical signal in passage through the scintillator material. For this purpose it is required that the both photoreceivers have identical response in the absence of attenuation. This is desirable from the standpoint of maxim performance. In this respect, the ratio of the two responses in the absence of attenuation should be known. This ratio can be ascertained by specially designed calibration experimental steps. The calibration steps may be essential even if the structure is fabricated to be symmetrical on both sides.

As to the method of fabrication, it is considered that quaternary InGaAsP pin diodes can be fabricated on both sides of an InP scintillator slab by epitaxially growth techniques. Among the examples of such techniques are the molecular beam epitaxy (MBE) and the metal-organic chemical vapor deposition (MOCVD). MBE and MOCVD techniques are known for the quality of epitaxial layers they produce.

It should be noted that other techniques for optically tight integration of photoreceiver units can be used advantageously, especially for scintillator materials other than InP, where lattice-matched layers sensitive to the scintillator luminescence may not be available for high-quality epitaxial growth. Even for InP, where lattice-matched epitaxy of photosensitive layers sensitive to InP luminescence are well known, the optically tight integration of photo-diodes can be achieved on opposite sides of the InP scintillator body by single-sided epitaxial growth of pin diodes on two InP wafers with the subsequent bonding of the substrate sides of said two InP wafers by known techniques, such as the wafer fusion.

We are referring now to FIGS. 8 and 9, illustrating the epitaxial pin diode designs. FIG. 8 shows a diode with unacceptable leakage, due to a parasitic current path on the cleaved crystal sidewall illustrated by the arrow. Other structures known to those skilled in the art may have an exposed sidewall as a result not of cleaving but other methods such as laser scribing, sawing, or mesa etching. FIG. 9 shows the preferred design of the invention, where the sidewall is no longer under bias. In the design of FIG. 9 the diode essentially uses only interior pin junctions.

In the arrangement of FIG. 9 epitaxially grown diode structure is nin rather than pin with the p$^+$ region subsequently introduced by Zn diffusion. The separation from the edge of the Zn diffusion to the cleaved surface should be sufficiently large that the nin structure near the sidewall shall be in approximate equilibrium, so that under reverse bias of the diode the parasitic current along the sidewall would be negligible. In the preferred arrangement a separation larger than 5 μm, and more specifically within the range of 10 μm, should be sufficient.

The technology for implementation the cleaved-pixel design of FIG. 9 has been developed to minimize the surface leakage at cleaved surfaces of the pixel. Surface leakage is a known problem and it had been previously encountered in the implementation of InGaAs avalanche photodiodes (APD) for optical telecommunications device similar to the invention, since the low dark current requirement is of paramount importance. It has been found that a preferred solution is to avoid placing the cleaved surface under voltage. In the invention (see FIG. 9), to circumvent the problem of surface leakage, the pixel design has been changed, so that the surface is no longer under the bias. In the arrangement of FIG. 9 there is no p$^+$ region near sidewall, the p$^+$ region exists only in the interior. Thus, the sidewall is in equilibrium, and there is no current there. An important aspect of this arrangement is that it assures a low level of leakage. In the prior art similar pin diodes were used to detect internal light coming from the top. The invention utilizes pin diodes to detect internal light generated within the material. In the embodiment of FIG. 9, the epitaxial design is used to detect the internal light/luminescence generated within the material itself. Similar fabrication principles will be followed in manufacturing of the two-sided pixel. The preferred fabrication sequence of the method of the invention is based on Zn deposition and diffusion in an OMCVD reactor.

We are turning now to the issue of how the position of the ionization event can be determined from the response ratio of the two photoreceivers or diodes formed on both faces or sides of the wafer. For the purposes of the invention the following is assumed: a symmetric pair of photoreceivers or photodiodes is provided, the wafer is made of a mildly absorbing scintillator material, and the position z is a well behaved function of the response ratio.

Let the luminescent signal $GS_0(E)$, where $S_0$ is normalized to unity, $\int S_0(E)dE=1$ be generated a distance z from the detector surface, as illustrated in FIG. 6. The emitted energy is isotropic, so that the energy emitted in unit energy interval per unit solid angle is $(G/4\pi)S_0(E)$. The total energy $D_i(z)$ reaching the i-th detector surface (i=1, 2) is attenuated, $D_i(z)=A_i(z)$ G.

In the calculation of the attenuation functions $A_i(z)$ it is essential to consider photon recycling. In an ideal scintillator (no absorption) there is no attenuation (and no recycling) and each detector receives half the emitted energy, $A_i(z)=0.5$, irrespective of the distance. In the presence of absorption, characterized by the interband absorption coefficient $\alpha(E)$, the detection probability for a photon at energy E (averaged over all angles at a fixed value of z) is given by $$p_1(E, z) = \int_0^\infty \exp[-\alpha(E)] \frac{\cos\theta}{2r^2} \rho\, d\rho, \tag{1}$$

$$p_1(z) = \int p_1(E, z) S_0(E)\, dE \tag{2}$$

where $\rho = z \tan\theta$ and $r = z/\cos\theta$. Equation (2) describes the detection probability by the $1^{st}$ detector of a single photon, averaged over the emission spectrum $S_0(E)$. The detection probability $p_2(z)$ for the $2^{nd}$ detector is defined in a similar fashion.

The bilities (1) and (2) are referred as single-pass probabilities, because they do not include the subsequent fate (recycling, i.e., re-emission, re-absorption, and so on) of the absorbed photon. The absorption coefficient $\alpha(E)$ in Eq. (1) corresponds to the interband absorption since free-carrier absorption in the spectral range $S_0(E)$ is relatively negligible, $\alpha_{fca} \ll \alpha(E)$.

If free-carrier absorption can be neglected, then every act of absorption will be interband absorption, followed by re-emission of the spectrum $S_0(E)$ in all directions (photon recycling). This may be appropriate only if the thickness of the sample is much smaller than the inverse free-carrier absorption coefficient, so that $z\alpha_{fca} \ll 1$ for all z of interest. Inclusion of free-carrier absorption can be done, if non-negligble, in a similar fashion, resulting in the single-pass probability $p_{fca}(z)$, viz.

$$p_{fca}(E, z) = \frac{\alpha_{fca}}{4\pi} \int \exp[-\alpha(E)] \frac{d^3 r}{r^2} \tag{3}$$

$$p_{fca}(z) = \int p_{fca}(E, z) S_0(E)\, dE \tag{4}$$

The combined probability $P(z) = p_1 + p_2 + p_{fca}$ describes the likelihood of the photon loss at this stage, and the alternative, $1 - P(z)$, is the probability that a new hole is created through interband absorption.

We refer now to FIG. 10, which is a schematic diagram of the basic processes taking place in InP scintillator with two photon-absorbing photodiode sides or surfaces, similar to that of FIG. 6.

The minority carrier ("hole" h) initially created by the ionizing interaction has the probability $\eta$ to generate a photon (the energy distribution of the generated photons is described by the spectrum S). The generated photon can either reach detectors 1 and 2 (probabilities $p_1$ and $p_2$, respectively) or disappear through free-carrier absorption (probability $p_{fca}$). All these probabilities depend on the position z, where as the dependence on the photon energy has been eliminated by averaging over the spectrum, as in Eq. (2). As already stated, the combined probability $P(z) = p_1 + p_2 + p_{fca}$ describes the likelihood of the photon loss at this stage, and the alternative, $1 - P(z)$, is the probability that a new hole is created through interband absorption. The cycle of hole-photon-hole transformation repeats ad infinitum, with the same probabilities of photon reaching the photodiodes 1 and 2 at each stage.

An approximation involved in the diagram of FIG. 10 is the neglect of change in the coordinate of the hole in different cycles. The latter can be taken into account by replacing the simple geometric progression by a full blown solution of the diffusion-like equation. This will introduce quantitative corrections, but will not change the qualitative conclusion about the position dependence.

As illustrated in FIG. 10, the cycle of hole-photon-hole transformation repeats continuously. Most of the scintillation photons reaching the detectors surface are not photons directly generated by the electrons and holes at the site of the gamma particle interaction, but photons that have been re-absorbed and re-emitted a multiple number of times.

The total signal in detector 1 is a sum of the single-pass contributions from different cycles and can be summed as a geometric progression, viz.

$$D_1(z) = G\eta p_1(z) \times \sum_{n=0} [\eta(1-P)]^n = \frac{G\eta p_1(z)}{\xi + \eta P(z)} \tag{5}$$

Similarly, for detector 2, one has $$D_2(z) = G\eta p_2(z) \times \sum_{n=0} [\eta(1-P)]^n = \frac{G\eta p_2(z)}{\xi + \eta P(z)} \tag{6}$$

The attenuation functions are therefore given by $$A_1(z) = \frac{\eta p_1(z)}{\xi + \eta P(z)} \tag{7}$$

$$A_2(z) = \frac{\eta p_2(z)}{\xi + \eta P(z)} \tag{8}$$

It has been noted that the ratio of the two signals is described in terms of the single pass probabilities only. This is a consequence of the present approximation, which assumes the single-pass probabilities to be the same at each stage. This approximation corresponds to neglecting the possible change in the coordinate of the hole in different cycles and is the only approximation involved in this picture. It can be improved by replacing the simple geometric progression by a full blown solution of a diffusion-like equation.

The radiative recombination spectrum $S_0(E)$ involved in the above calculation can be accurately determined from the measured spectrum $\alpha(E)$ of interband absorption (e.g., corresponding to the transmission spectrum shown in FIG. 5) by using van Roosbroeck-Shockley relation (with an appropriate normalization factor C):

$$S_0(E) = C E^2 \alpha(E) \exp(-E/kT) \tag{9}$$

Equation (9) is an exact thermodynamic relation.

Figure 5:
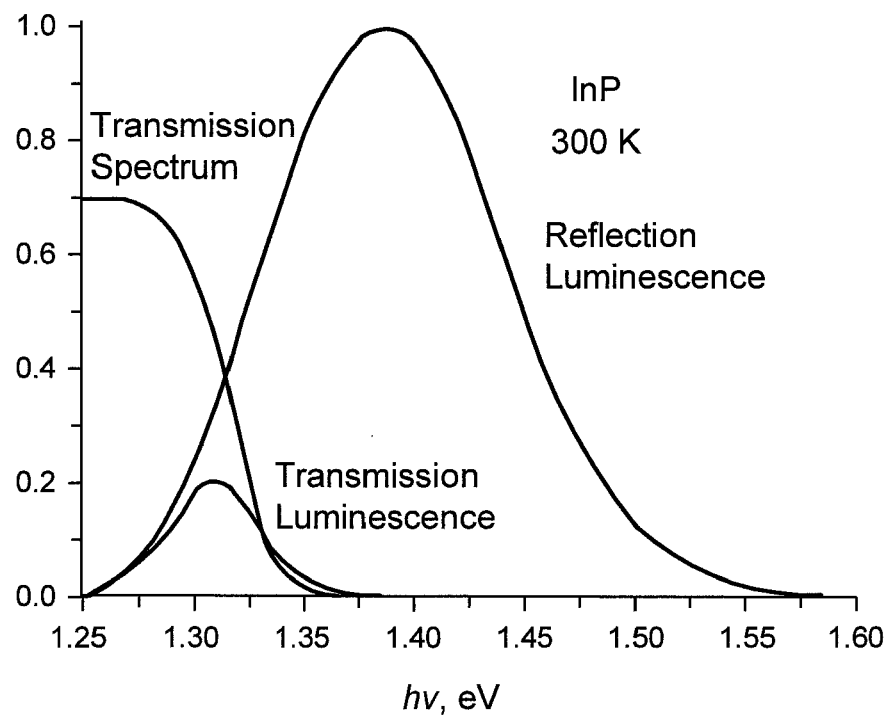
FIG. 5 is a chart showing the spectra obtained at a room temperature experiments.

The re-constructed spectrum (see equation 9) can be compared with the reflection luminescence spectrum (see FIG. 5). However, the latter must be adjusted for wavelength-dependent attenuation.

Equations (5-8) illustrate the importance of taking into account photon recycling, especially in the case when single-pass probabilities are relatively low. In these equations, one can then neglect the second term $\eta P(z)$ in the denominator and observe that the total signal is enhanced compared to that at a single-pass by a large factor of $\eta/\xi$. The radiative efficiency $\eta > 0.9$ in our InP samples, so that $\xi \equiv 1 - \eta < 0.1$ and the enhancement is about tenfold. Theoretically, the radiative efficiency in good-quality III-V compound semiconductors can exceed 99%, leading to nearly 100-fold enhancement of radiative signal.

Figure 11:
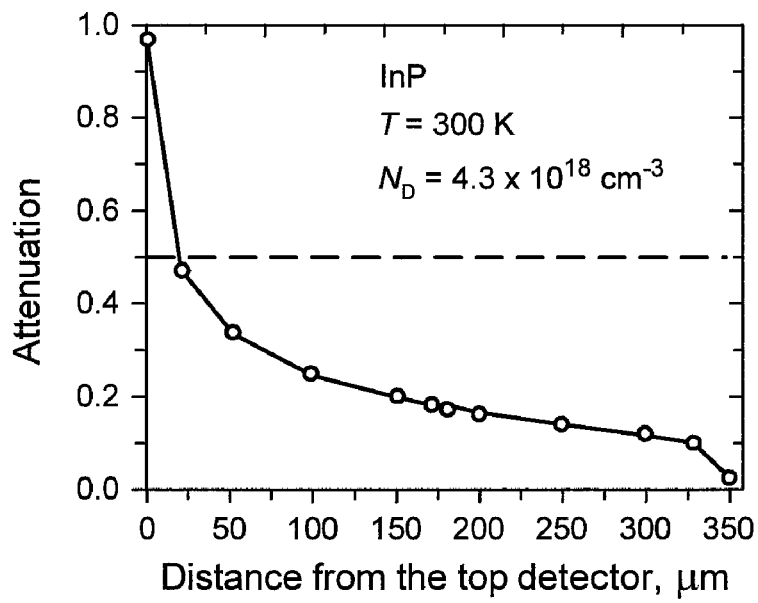
FIG. 11 is a chart showing calculated attenuation of luminescence of an InP scintillator.

FIG. 11 is a chart showing calculated attenuation of luminescence of an InP scintillator. The attenuation is calculated for the top-surface detector ($z=0$) in the presence of a second detector on the bottom surface (z=d). In one embodiment the scintillator thickness is about d=350 μm. The dashed line of FIG. 11 shows the attenuation expected from an ideal (non-absorbing) scintillator, where each surface detector would receive exactly 50% of the luminescence.

Figure 12:
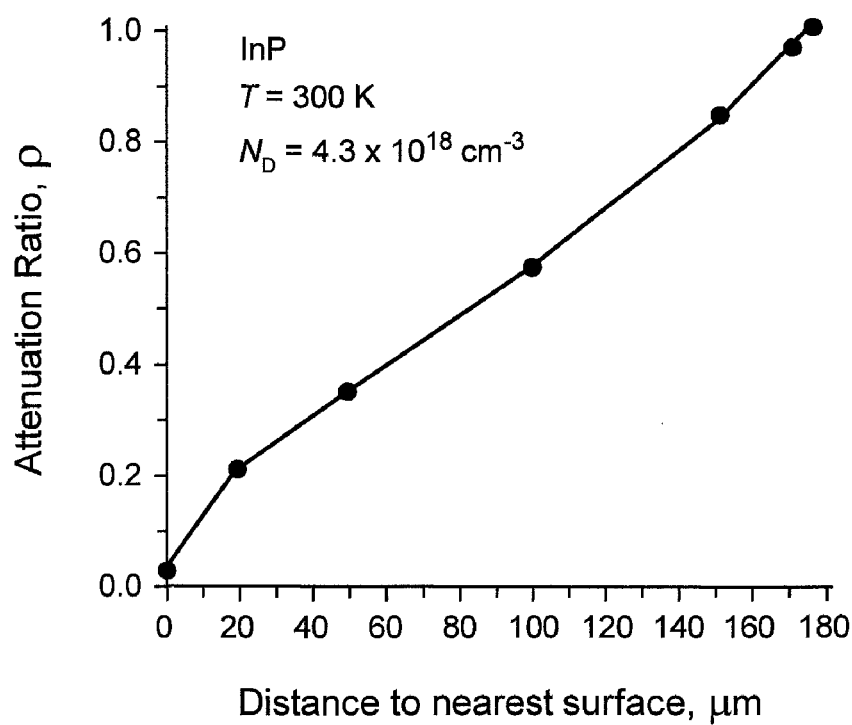
FIG. 12 is a chart showing the attenuation ratio for signals recorded by two surface detectors for the same radiation event.

FIG. 12 is a chart illustrating the attenuation ratio (see equations 7 and 8) for signals recorded by two surface detectors for the same radiation event.

The scintillator thickness is d=350 μm and the ratio is shown for $z \leq d/2$, since one has, by symmetry, $\rho(z) = \rho^{-1}(d-z)$ The calculated attenuation function for one detector is shown in FIG. 11 and the expected ratio of the signals, $\rho(z) = D_1(z)/D_2(z)$ is shown in FIG. 12. It is observed that the ratio $\rho(z)$ of the measured signals, can be used to extract the positional information about the ionization event. This information becomes available substantially in virtue of the absorbing character of the scintillator. For the "ideal" non-absorbing scintillator this information is not accessible, even small amount of absorption can be advantageously employed.

Once the z coordinate of the ionization event is known, both signals $D_1(z)$ and $D_2(z)$ can be analyzed to retrieve the actual amount of the deposited energy by the event, as characterized by the actually generated number of the minority carriers and the "intrinsic" luminescent signal G. For this purpose, one simply needs to invert the attenuation functions and calculate G as follows:

$$G = \frac{D_1}{A_1(z)} \quad (10)$$

$$G = \frac{D_2}{A_2(z)} \quad (11)$$

It is to be noted that both estimates (see equation 10) and (see equation 11) can be viewed as statistically independent measurements of the same quantity G so that the combined estimate has a higher precision either of them individually.

It should be noted again that while the dependence on z of the attenuation functions $A_i(z)$ may not appear essential in the context of equations (10) and (11), it is essential for the position determination of the ionizing event within the scintillator.

In the invention the useful attenuation must be related to the extinction of light in passage through the scintillator material. Other forms of attenuation may be associated with the reflection of light at surfaces of the scintillator slab, imperfect efficiency of the photoreceiving system, etc. These are parasitic forms of attenuation, not useable for the inventive purpose, which have to be minimized by technology. Thus, in order to minimize the surface reflection, one needs to integrate the photoreceivers in an optically tight fashion using materials with similar refractive index and no air gaps. In the preferred embodiment of the invention this is accomplished by epitaxial growth. However, other means of integration are also contemplated. For example, wafer bonding or wafer fusion can be used advantageously. Low-temperature bonding of two dissimilar materials, similar to the hydrophilic Si-to-Si bonding is known in the art. The bonding is based on the van der Waals attraction between two flat hydrophilic surfaces. Bonding semiconductor wafers (usually to silicon substrates) is an increasingly popular approach for applications involving integration of heterogeneous semiconductor materials. High-quality silicon-on-insulator substrates are commercially available as 12" wafers from the French company SOITEC, based on their patented "Smart Cut" technology. Another approach is to combine InP-based diode hetero-structure wafer with GaAs scintillator wafer by direct wafer fusion. A further existing approach is to perform wafer bonding of two dissimilar materials with an intermediate thin $SiO_2$ layer. However, in this case the thin intermediate layer must be very thin, substantially thinner than 10 nm.

In situations, where a parasitic attenuation is present, e.g., owing to reflection, it is possible to use equations similar to equations (10) or (11) to correct for the reflection loss. However, this correction bears no relation to the approach of the invention associated with the accurate determination of the deposited energy in the presence of tangible light extinction by the material. The problem addressed by the device of the invention is how to quantify the deposited energy when one has to distinguish between the signals arising from a large energy deposited far from the photoreceiver surface and from a smaller energy deposited near said surface. The dependence on z of the attenuation functions $A_i(z)$ may not appear essential in the context of equations (10) and (11). However, such dependence is essential for the position determination of the ionizing event within the scintillator.

In the preferred embodiment of the present invention, the disposition of two photoreceivers or photodiodes on both sides of the scintillator slab is substantially symmetric and the diodes themselves are advantageously similar in shape, area, and performance. This arrangement is provided to facilitate diode calibration. If, however, the diodes are asymmetric, e.g., of different area, it should not be difficult to take this into account by modifying attenuation functions $A_i(z)$ We are referring now to FIG. 13 which is a schematic diagram showing the scintillator slab of the invention with two integrated arrays of photoreceivers in the form of small area diodes on opposite sides of the slab. In the preferred embodiment, symmetric photodiodes of large-area are contemplated. In one of the embodiments such photodiodes can be about 1 mm in lateral dimensions. However, it may also be advantageous to implement arrays of smaller photodiodes, similar to that of FIG. 3. This design with an array of photodiodes on both sides of the scintillator slab is shown schematically in FIG. 13.

The individual diodes of the array need not be symmetric to one another, but the overall array areas should overlap. The body contact shown schematically may be implemented on both sides or one side only, as for example shown in FIG. 7.

An arrangement, consisting of multiple double-sided scintillator-detector-array wafers is also contemplated by the invention. An example is a 1 $cm^3$ volume of compound semiconductor material made up of 10 double-sided compound semiconductor-detector-arrays each having 1 μm nominal thickness. Read-out electronics is integrated in this arrangement which is fabricated of silicon or compound semiconductor materials. Larger volumes of compound-semiconductor scintillator can be used to increase the efficiency of the overall scintillation-detection system in detecting a three-event sequence of Compton events, at the cost of greater expense of the system.

It is a feature of the invention that the scintillation event occurring at the perimeter of a detector array element be measured as distributed between the two or more detector elements having appreciable energy detected from that event. By assessing the relative energy detected among several detectors in any particular region, the lateral position of the scintillation event can be determined. Thus, according to the invention, the position of the scintillation event within the compound semiconductor scintillation wafer can be determined in all three spatial dimensions.

It is a further feature of the invention that all methods capable of reducing the capacitance of a detector mode be employed. For example, a smaller detector device, a thicker detector intrinsic region, and other methods can be utilized. Reduction of capacitance permits the detection of fewer and fewer electrons in the presence of various noise sources associated with read-out, such as switching noise, 1/f noise, Johnson noise, kT/C noise, etc.

The photoreceiver systems may be implemented as charge-coupled imaging devices (CCD), e.g. silicon CCD arrays. The CCD frame rate in this case should be fast enough to suppress the probability of two ionizing interactions within the same signal accumulation period. An important issue addressed by the invention is the optically tight connection of the CCD to the scintillator slab, so as to avoid the parasitic attenuation.

According to the invention it is imperative to integrate the scintillator wafer with photodetectors having a substantially similar or even higher refractive index in an optically tight fashion. The invention provides substantial improvement in the field of epitaxial photoconductors on InP scintillator body, implemented as ultra-low leakage pin diodes based on quaternary InGaAsP materials.

What is claimed is:

1. An article comprising a single slab generating scintillation light in response to an ionization event resulted from interaction by a high energy particle, said article comprising:
a single slab generating a scintillation light in response to an ionization event, said single slab being formed with at least two sides; said ionization event resulting from interaction of high energy particles within a material of said single slab between said at least two sides, photoreceivers sensitive to the scintillation light being integrated on each said side in an optically-tight fashion, so signals produced by said ionization event are independently received by said photoreceivers on each said side of the single slab, an arrangement for quantitative analysis of said independent signals generated by said photoreceivers relative one another, said photoreceivers and said analyzing arrangement determining a position of said ionization event within said single slab material relative to said at least two sides of the single slab, and
a correcting arrangement for correcting said independent signals, so as to provide attenuation of said scintillation light generated by said ionization event between said at least two slab sides and passing through said single slab material.

2. An article of claim 1, wherein said single scintillator slab is a direct bandgap semiconductor.

3. An article of claim 2, wherein said direct bandgap semiconductor is InP.

4. An article of claim 1, wherein said photoreceivers are p-i-n diodes.

5. An article of claim 1, wherein said photoreceivers are epitaxially grown on each said slab side.

6. An article of claim 1, wherein operation of said analyzing arrangement is based on pre-calculated functional dependence of a ratio of said independent signals to a position of said ionization event relative to said at least two sides of the single slab.

7. An article of claim 6, wherein spatial accuracy of a determined position of said ionization event being substantially more precise than a thickness of the slab.

8. An article of claim 1, wherein operation of said signal correcting arrangement is based on pre-calculated functional dependence of the signal attenuation to a position of said ionization event relative to said sides of the single slab.

9. An article of claim 1, wherein speed of operation of said photoreceivers is faster than rate of the ionization events occurring within the single scintillator slab material.

10. An article of claim 1, wherein said photoreceivers are symmetrically positioned on said sides of the single slab.

11. An article of claim 1, wherein said photoreceivers are integrated diode arrays.

12. An article of claim 1, wherein said photoreceivers are CCD imaging arrays.

13. An article of claim 1, wherein said at least two sides are opposing sides of said single slab.

14. An article, comprising:
a scintillator array for determining energy and propagation direction of incident gamma particles, said array comprising a plurality of individual pixels, each said pixel comprising a single scintillator slab generating scintillation light in response to an ionization event, each said single slab being formed with at least two sides, said ionization event resulted from interaction of a high energy particle within a material of said single slab between said at least two sides, photoreceivers sensitive to the scintillation light being integrated on each said side in an optically-tight fashion, so signals produced by said ionization event are independently received by said photoreceivers on each said side of the single slab, an arrangement for quantitative analysis of said independent signals generated by said photoreceivers relative to each other, said photoreceivers and said analyzing arrangement determining a precise position of said ionization event within said single slab material relative to said at least two sides of the single slab, said array is a three-dimensional array further comprising a correcting arrangement for correcting said independent signals in the single scintillator slab of each said pixel, so as to provide attenuation of said scintillation light generated by said ionization event between said at least two slab sides and passing through said single slab material.

15. An article of claim 14, further comprising an arrangement for determining energy and propagation direction of said incident gamma particles by analyzing energies deposited in said individual pixels, on the basis of Compton kinematic equations.

16. An article of claim 15, wherein the analysis of the energies deposited in said individual pixels includes the precise positions where the energies are deposited within said individual pixels.

17. An article of claim 14, wherein said article forms a Compton imaging system.

* * * * *